United States Patent [19]

Coulson et al.

[11] 4,168,464

[45] Sep. 18, 1979

[54] SET POINT SENSING SYSTEM FOR NUMERICALLY CONTROLLED MACHINE TOOLS

[75] Inventors: John N. Coulson, El Cajon; John C. Hall, Jr., Poway; Conrad D. Snyder, El Cajon; Arlo J. Trieglaff, San Diego, all of Calif.

[73] Assignee: General Dynamics Corporation, San Diego, Calif.

[21] Appl. No.: 902,645

[22] Filed: May 4, 1978

[51] Int. Cl.$^2$ .............................................. G01R 27/26
[52] U.S. Cl. .................................................. 324/61 R
[58] Field of Search ........................... 324/61 R, 61 P; 361/280

[56] References Cited

U.S. PATENT DOCUMENTS

| | | | |
|---|---|---|---|
| 2,604,512 | 7/1952 | Bacon et al. | 324/61 R |
| 2,825,978 | 3/1958 | Davis | 324/61 R X |
| 2,892,152 | 6/1959 | Buisson | 324/61 R |
| 3,340,400 | 9/1967 | Quittner | 324/61 R X |
| 3,355,664 | 11/1967 | Pranke | 324/61 R |
| 3,357,245 | 12/1967 | Wolfrum | 324/61 R X |
| 3,387,776 | 6/1968 | Stillwell et al. | 324/61 R |
| 3,466,391 | 9/1969 | Ellis | 324/61 R X |
| 3,517,282 | 6/1970 | Miller | 324/61 R |
| 3,843,924 | 10/1974 | Wahlgren | 324/61 R |
| 4,103,252 | 7/1978 | Bobick | 361/280 X |

FOREIGN PATENT DOCUMENTS

| | | | |
|---|---|---|---|
| 189281 | 3/1957 | Austria | 324/61 P |
| 685366 | 4/1964 | Canada | 324/61 |
| 1091346 | 10/1960 | Fed. Rep. of Germany | 324/61 R |
| 2247032 | 4/1973 | Fed. Rep. of Germany | 324/61 P |
| 1111036 | 2/1956 | France | 324/61 |

*Primary Examiner*—Stanley T. Krawczewicz
*Attorney, Agent, or Firm*—John R. Duncan

[57] ABSTRACT

An automatic system for sensing and establishing the set point for numerically controlled machine tools. Before operating a numerical control (N/C) machine tool, such as a milling machine, it is necessary to precisely locate a basic reference point on the workpiece or work holding fixture. The disclosed system comprises a capacitive bridge sensing device positioned at the set or reference point. When a machine tool is positioned precisely at the set point, a null reading is observed on suitable readout means. When the tool is moved from null, a reading proportional to displacement is observed. The sensor basically consists of four individual capacitor plates arranged in a circle around a center point, in "X" and "Y" directions. The plates are excited by an audio oscillator and coupled into a bridge instrumentation oscillator. As a grounded machine tool is moved adjacent to these plates the capacitance between the individual plates and the grounded tool varies. In each of the "X" and "Y" directions the plus and minus capacitance are differentially measured using the amplifier to observe the phase difference in the bridge. The output of the differential amplifier is a sinewave whose phase is proportional to the grounded tool's displacement from center, which can be displayed on a digital readout device. An operator may then precisely locate the center position by manipulating the N/C machine and observing the readout.

3 Claims, 8 Drawing Figures

4,168,464

SET POINT SENSING SYSTEM FOR NUMERICALLY CONTROLLED MACHINE TOOLS

BACKGROUND OF THE INVENTION

This invention relates to the operation of numerically controlled machine tools and, more specifically, to an apparatus for locating a starting point for numerical controlled machining operations.

Numerically controlled machine tools, such as milling machines, are coming into greater use in the machining of complex parts requiring machining to very precise tolerances. While machining is very rapid once begun, set-up and adjustment of a workpiece at the start of operations is complex and time consuming. The workpiece must be precisely located at a "zero reference" starting position. Errors in positioning the workpiece can result in a scrapped part.

Presently, a zero reference point on a workpiece is located using machine bed markings, dial micrometers, etc. Two operators are generally required, and accuracy is entirely dependent on the skill of the operators.

Thus, there is a continuing need for a faster, more reliable, method and apparatus for locating a zero reference starting position for numerically controlled machine tools.

OBJECTS OF THE INVENTION

An object, therefore, of this invention is to provide reference position means overcoming the above-noted problems.

Another object of this invention is to provide a more rapid technique for locating a zero reference starting position for numerically controlled machine tools.

A further object of this invention is to provide a device enabling more reliable and accurate set-up of workpieces for numerically controlled machining.

SUMMARY OF THE INVENTION

The above objects, and others, are accomplished in accordance with this invention by a reference position monitor adapted to be placed on a workpiece or a workpiece holding fixture. The monitor includes a capacitive bridge sensing device having four individual capacitive plates arranged in a circle around a center point. The plates are excited by an audio oscillator. One pair of opposite plates can be considered to be the "x-pair" and the other the "y-pair" to provide alignment in x and y directions. Each pair of plates is coupled into a bridge instrumentation amplifier and acts as a capacitive bridge sensing device. As a grounded metal member, such as a milling tool, is passed above the plates, the capacitance between the individual plates and the grounded plate varies.

Considering only the x-pair of plates, the "plus x" and "minus x" capacitance are differentially measured using the amplifier to observe the phase difference in the bridge. The output of the differential amplifier is a sinewave whose phase is proportional to the grounded tool's displacement from the center. The signal is passed through a bandpass filter to eliminate electrical noise picked up from the industrial environment. The phase of the signal is then compared with the reference signal in a phase meter. The output of the phase meter is displayed on a digital readout in an operator's console as displacement from center along the x-axis in thousandths of an inch. Similarly, the y-pair of sensors produces a displacement readout along the y-axis. The operator then manipulates the N/C machine while observing the readout to bring the tool to the exact zero reference point. This device is capable of relocating center to better than ±0.0005 inch.

BRIEF DESCRIPTION OF THE DRAWING

Details of the invention, and of preferred embodiments thereof, will be further understood upon reference to the drawing, wherein.

DETAILED DESCRIPTION OF THE INVENTION

Figure 1:
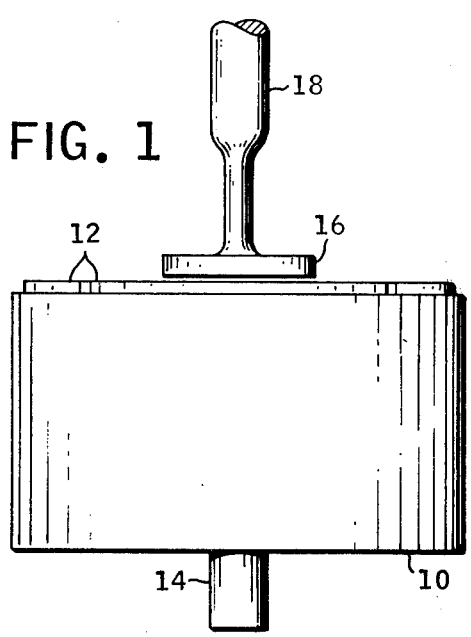
FIG. 1 is an elevation view of the sensor housing and machine tool.

Referring now to FIG. 1, there is seen a generally cylindrical sensor housing 10 having a printed circuit board 12 bearing a sensor capacitor pattern covering one end. The other end of housing 10 is closed and bears an outwardly-extending locating pin 14. Pin 14 is sized for positioning in a zero reference position or set-point opening in a workpiece, workpiece holding fixture, etc. A numerical control machine tool is programmed to perform all operations at programmed distance from the set-point. Thus, housing 10 rests on the fixture with the exact desired location assured by pin 14.

A disk or tool 16 is mounted on a shank 18 held in the cutting tool's chuck (not shown). While in many cases an actual milling head can be utilized as disk 16, highest accuracy is obtained with a thin cylindrical disk, as is discussed in detail below. Disk 16 and shank 18 are held in the machine chuck during alignment with sensor 10. When alignment is complete, the disk 16 and shank 18 assembly is replaced with a cutting tool and normal operation of the machine tool commences.

Figure 2:
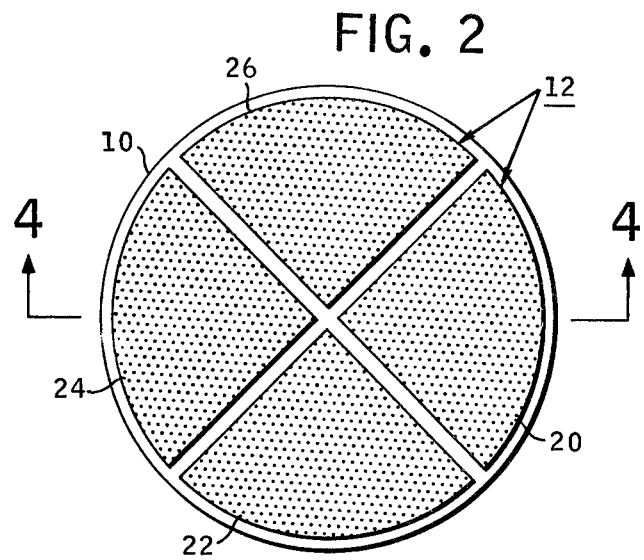
FIG. 2 is a plan view of a first embodiment of the sensor capacitor plates.

One pattern of capacitive plates 20, 22, 24, and 26 is illustrated in FIG. 2. These plates are preferably formed as thin foil sheets on the upper surface of printed circuit board 12. As is apparent from FIG. 2, when a disk 16 is exactly positioned over the center of the pattern, it will be equally spaced from all of the capacitive plates 22. As the disk moves off center, it covers more of some and less of other plates. The change in coverage of opposing pairs of plates will be proportional to the distance from the center along x and y axes. Thus, plates 20 and 24 could be considered to be the "x" axis, while plates 22 and 26 lie along the "y" axis.

Figure 3:
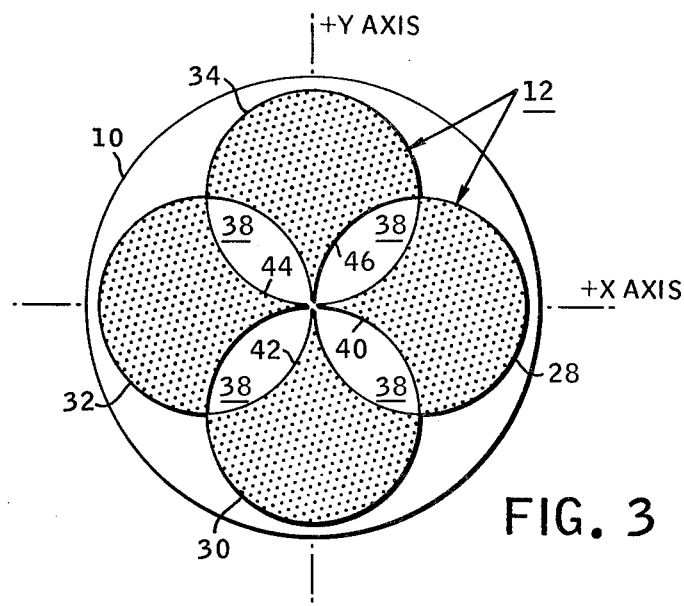
FIG. 3 is a plan view of a second embodiment of the sensor capacitor plates.

An especially preferred capacitive plate pattern is shown in FIG. 3. The plates are formed by constructing four orthogonal circles 28, 30, 32 and 34 on an axis system with circles 28 and 32 on the x-axis and circles 30 and 34 on the y-axis. All four circles are drawn tangental to a center point 36, with the center of each circle a radius distance from the center point on the coordinate axes. Areas 38 are removed, leaving four circular wedges 40, 42, 44 and 46 facing each other along the axis of the coordinate system. The points at which wedges 40, 42, 44 and 46 meet at center point 36 are also etched away, creating four electrically independent capacitive plates. The capacitive plate surfaces within circles 28, 30, 32 and 34 are schematically indicated by strippling.

With this arrangement, it is preferred that a grounded circular disk 16 (such as is shown in FIG. 1) with a diameter equal to the diameter of each of circles 28, 30, 32 and 34, be mounted in the machine tool chuck immediately above the sensor capacitive plate pattern. When centered, the disk is in the null position. As discussed above in conjunction with FIG. 1, the disk forms the other plate of an air-dielectric capacitor with each plate or wedge of the sensor. The capacitance of each capacitor thus formed is directly proportional to the mutual surface area shared between an individual sensor plate and the grounded disk. As the disk is moved along an axis toward a sensor plate, the shared area increases, thus increasing capacitance according to the formula $C = \epsilon A/d$ where "C" is capacitance, "$\epsilon$" is the relative dielectric constant, "A" is the shared area between the two plates of the capacitor and "d" is the distance between the plates. The pointed shapes of wedges 40, 42, 44 and 46 cause a very rapid increase in the shared area as the disk is moved over the sensor toward one of the wedges. Thus, the preferred sensor plate configuration shown in FIG. 3 greatly increases the sensitivity of the instrument around center point 36 so that very accurate positioning of the disk over center point 36 can be accomplished.

Figure 4:
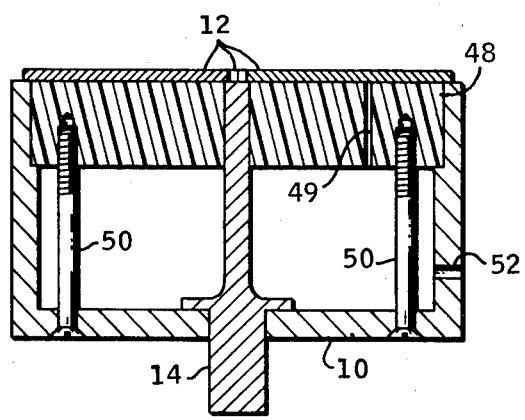
FIG. 4 is a section view through the sensor housing, taken on line 4—4 in FIG. 2.

The internal configuration of sensor housing 10 is illustrated in FIG. 4, which is a sectional view taken on line 4—4 in FIG. 2.

Housing 10 has a generally hollow cylindrical configuration. The open end of housing 10 is closed by a disk shaped plug 48. Plug 48 is formed from an electrically insulating material, such as methyl methacrylate. Plug 48 is held in place by a plurality of screws 50. Pin 14 extends through housing 10 and disk 48. The lower end of pin 14 is adapted to fit in a locating hole in a workpiece holding fixture, as discussed above.

Printed cicuit board 12 is fastened to the outer surface of disk 48 by any suitable means, such as an adhesive or screws (not shown). Suitable openings, such as indicated at 52 are provided for wiring from printed circuit board 12 to electronic components (described below) which may be located within housing 10. Similarly, an opening 52 is provided in the outer wall of housing 10 for wiring from the sensor to an external electronic console.

Figure 5:
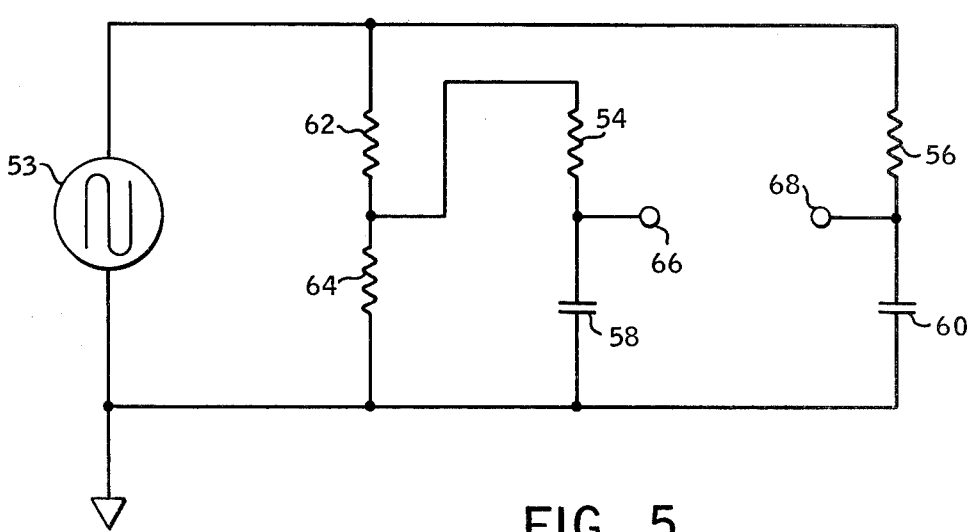
FIG. 5 is a schematic representation of a single-axis bridge circuit.

A schematic representation of the basic circuit representing a single axis of the sensor is shown in FIG. 5. Operating voltage is provided by a source 53. Resistors 54 and 56 are bridge resistors, typically having valves of 1 megohm each. Capacitors 58 and 60 represent the capacity between the grounded tool or disk 16 in the machine tool holder and the sensor capacitance plates (for example, plates 20 and 24). Resistors 62 and 64 form a voltage divider that insures that the excitation voltage supplied to resistor 54 is less than the excitation voltage supplied to the other bridge resistor 56. Typical values for resistors 62 and 64 are 200 ohms and 800 ohms, respectively. This concept of unequal drive voltages to the corresponding legs of the bridge is crucial to concept of measurement. The unbalanced drive provides a residual voltage difference between output contacts 66 and 68 (which may, for example, drive a digital display means) when the bridge is at null (i.e., when the capacitance of the sensor plates 58 and 60 is equal and resistors 54 and 56 are equal). The residual voltage allows the phase of the difference voltage to be measured under all conditions of bridge balance or imbalance. The phase of the difference voltage is the basic parameter which provides the extreme sensitivity to movement of the tool or disk 16 away from the center of the sensor array. In practice, about 20% of the input voltage from source 53 is the minimum amplitude of the signal output voltage which occurs at null or balance. The voltage on either side of null rises very rapidly, with the rate of change of phase being very rapid around null.

Figure 6:
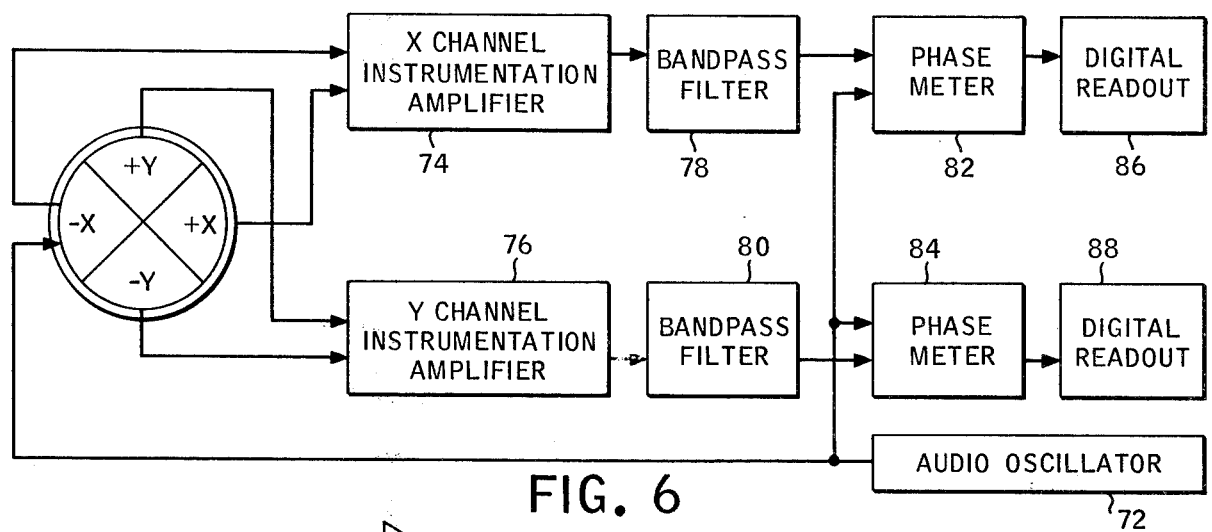
FIG. 6 is a block diagram of the sensing system.

A block diagram illustrating the electronic components of the overall system is provided in FIG. 6. The four individual capacitive plates 20, 22, 24 and 26 mounted on housing 10 are excited by audio oscillator 72. The "x" pair of plates (here, plates 22 and 36) are coupled into an x-channel bridge instrumentation amplifier 74. Similarly, the "y" pair of plates are coupled into x-channel bridge instrumentation amplifier 76. Preferably, amplifier 74 and 76 are located within housing 10. Output cables from amplifiers 74 and 76 go to a separate console containing the remainder of the electronic components. The outputs of each of amplifiers 74 and 76 is a sinewave whose phase is proportional to the displacement of grounded tool or disk 16 from the center point of the sensor array. The signals from amplifiers 74 and 76 are passed through bandpass filters 78 and 80, respectively, (to eliminate electrical noise picked up in the industrial environment) to phase meters 82 and 84, respectively, where the phase of the measured signal is compared to the reference signal from audio oscillator 72. Audio oscillator 72 is a conditioned wide range audio sweep oscillator, such as the unit described by Michael Lampton in the July 1971 issue of "Audio" at pages 30–32 and 59. The output of phase meters 82 and 84 is displayed on conventional digital readout means 86 and 88, respectively, which are calibrated in distance units showing distance along x and y axes from the center point. The readout means are located on the machine operator's console, so that he can easily manipulate the machine controls while observing the readout to locate the center position.

Figure 7:
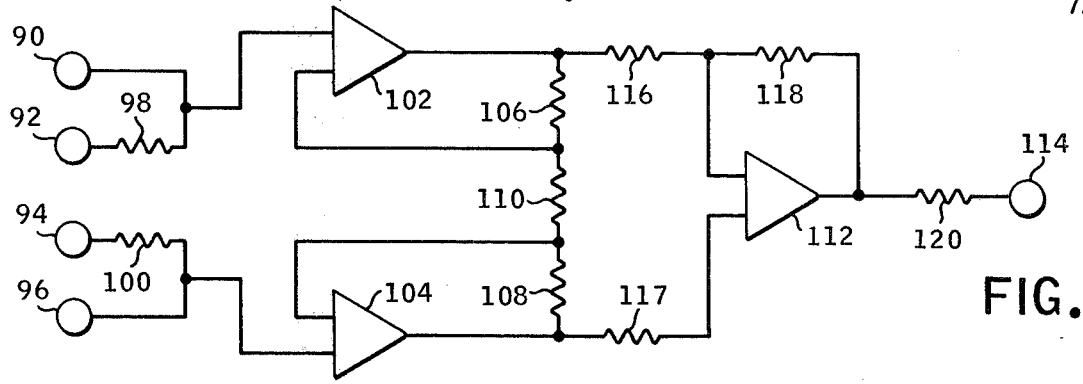
FIG. 7 is a schematic representation of the bridge amplifier circuit.

FIG. 7 is a schematic circuit diagram of each of instrumentation amplifiers 74 and 76. This amplifier is a hybrid amplifier having high input impedance allowing the use of one megohm bridge resistors, high common made rejection and compact size permitting location within housing 10.

One amplifier of the sort shown in FIG. 7 is provided for each of the "X" and "Y" pairs of capacitive plates. In the "X" channel amplifier, the signals from the "X" plates enters through inputs 90 and 96. Sine wave excitation is applied to inputs 92 and 94. Similarly, the "Y" channel amplifier, the signal from the "Y" set of plates enter inputs 90 and 96. Matched resistors 98 and 100 which form the upper legs of a bridge with the capacitive plates may typically have values of about 1 megohm. The bridge signal passes from points 90 and 96 to operational amplifiers 102 and 104, typically LM108A op amps from National Semiconductor. Feedback resistors 106 and 108 are matched resistors having a value of about 64.9 K ohms. The common resistor 110 may have a value of about 1 K ohm. Signals enter operational amplifier 112, typically a NA741 general purpose op amp from National Semiconductor. The signal from output 114 goes to the bandpass filters 78 and 80, as illustrated in FIG. 6. Typically the resistance of resistors 116, 117, 118 and 120 should be about 3.9 ohms, 3.9 K ohms, 3.9 K ohms and 2.2 K ohms respectively.

Figure 8:
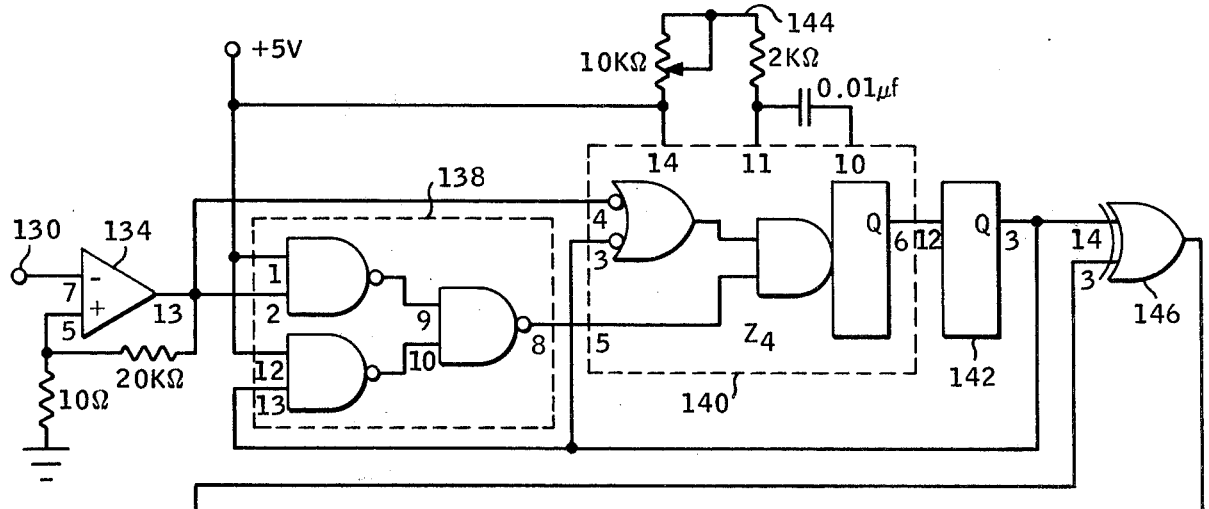
FIG. 8 is a schematic representation of the phase meter circuit.
Figure 8:
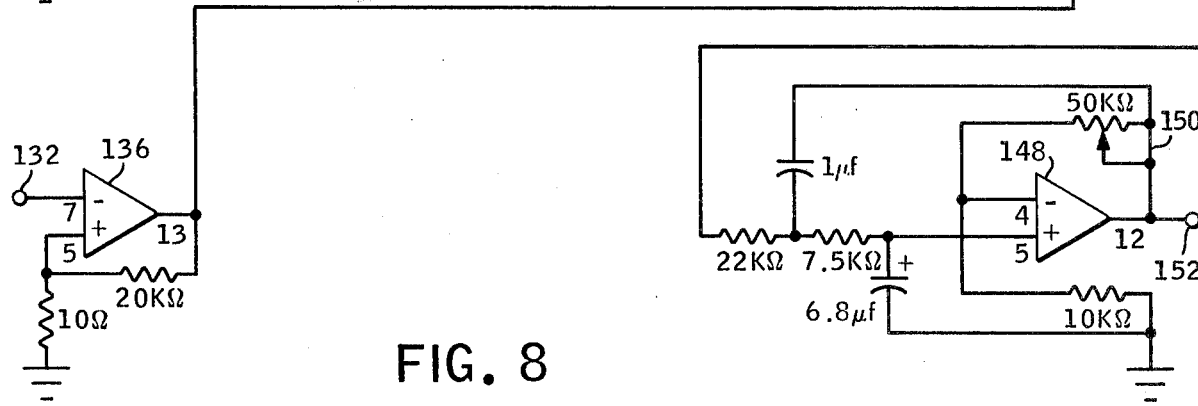

FIG. 8 provides a schematic representation of either of the phase meters 82 and 84. These adjustable phase meters accept two sinusoidal inputs, provides an offset adjustment for initializing the phase relationship between the two inputs and provides a direct current output voltage proportional to the phase difference of the input signals.

The incoming signals from bandpass filters 78 or 80 enters through inputs 130 with the reference signal from audio oscillator 72 entering at input 132. These signals pass to comparators 134 and 136 which convert the inputs to square waves. Unit 138, quad two-input gates, typically a 7400 available from Texas Instruments, unit 140, a Texas Instruments 74121 one-shot and unit 142, a Texas Instruments dual J-K master-slave flip-flop with clear combine to form a network which subtracts the single shot output from unit 140 from the leading edge of the wave form and adds the next single shot output of unit 140 to the trailing edge of the input wave form. This, in effect, time-delays the waveform by the single shot period. The single shot unit 140 is made continually variable by a typically 10 K ohm potentiometer 144 and hence allows for adjustment of the phase of the input waveform with respect to the input waveform at comparator 136.

The two measurement waveforms are applied to unit 146, typically an RCA CD4046AE phase locked loop, which acts as a special "exclusive or" phase comparator which provides an output pulse width equal in width to the absolute difference in phase at the input. Unit 148, typically a uA741 from Fairchild Semiconductor, forms a low pass filter which averages the incoming pulses and provides a DC output voltage proportional to the phase pulse width. A 50 K ohm potentiometer 150 is provided to adjust the scale factor of the DC output.

The output 152 from phase meters 82 and 84 pass to digital readout means 86 and 88, typically Analogic type AN 2535-1 digital panel meters as discussed above.

While certain specific circuits, proportions and arrangements were described in the above description of a preferred embodiment, these may be varied within the scope of this invention where suitable. For example, other electronic circuitry performing the function of that described above, may be used if desired.

Other variations, applications and ramifications of this invention will occur to those skilled in the art upon reading this specification. These are intended to be included within the scope of the invention, as defined in the appended claims.

We claim:

1. A system for sensing the set-point of a numerically-controlled machine tool set-up which comprises:
   a sensor positioned at the set-point;
   said sensor comprising four individual capacitor plates arranged in a circle around a center point coinciding with said set point, said capacitor plates consist of four equal sized circular plates spaced equally around said center point, the edge of each plate passing through said point, with overlapping areas of adjacent circles cut away and said plates out of electrical contact at said point, a line drawn through a first opposite pair of said plates and said center point defining an "X" axis and a line drawn through the second opposite pair of said plates and said center point defining a "Y" axis;
   a flat circular grounded metal member closely spaced above said sensor and adapted to be moved in a plane parallel to said sensor;
   an audio oscillator to excite said capacitor plates;
   first and second instrumentation amplifiers, the first connected to the pair of sensors along the "X" axis and the second connected to the pair of sensors along the "Y" axis;
   first and second bandpass filters for receiving signals from said first and second instrumentation amplifiers respectively;
   first and second phase meters for receiving signals from said first and second bandpass filters, respectively, and from said audio oscillator; and
   first and second digital readout means receiving signals from said first and second phase meters, respectively;
   whereby the first readout indicates the distance a grounded metal member near said sensor is away from said center point along the "X" axis and said second readout indicates the distance said metal member is from said center point along the "Y" axis.

2. The system according to claim 1 wherein said circular grounded metal member includes a flat circular metal disk having a diameter substantially equal to the diameter of each of said circular plates and an area less than the area of each of said circular plates.

3. The system according to claim 2 wherein said grounded metal member is mounted on a cylindrical shaft adapted to be held in the tool holding means of a metal working machine.

* * * * *